May 22, 1923.   1,456,312
K. IMHOFF
COMBINED SLUDGE SEPARATING AND DRYING BASIN
Filed Sept. 8, 1921
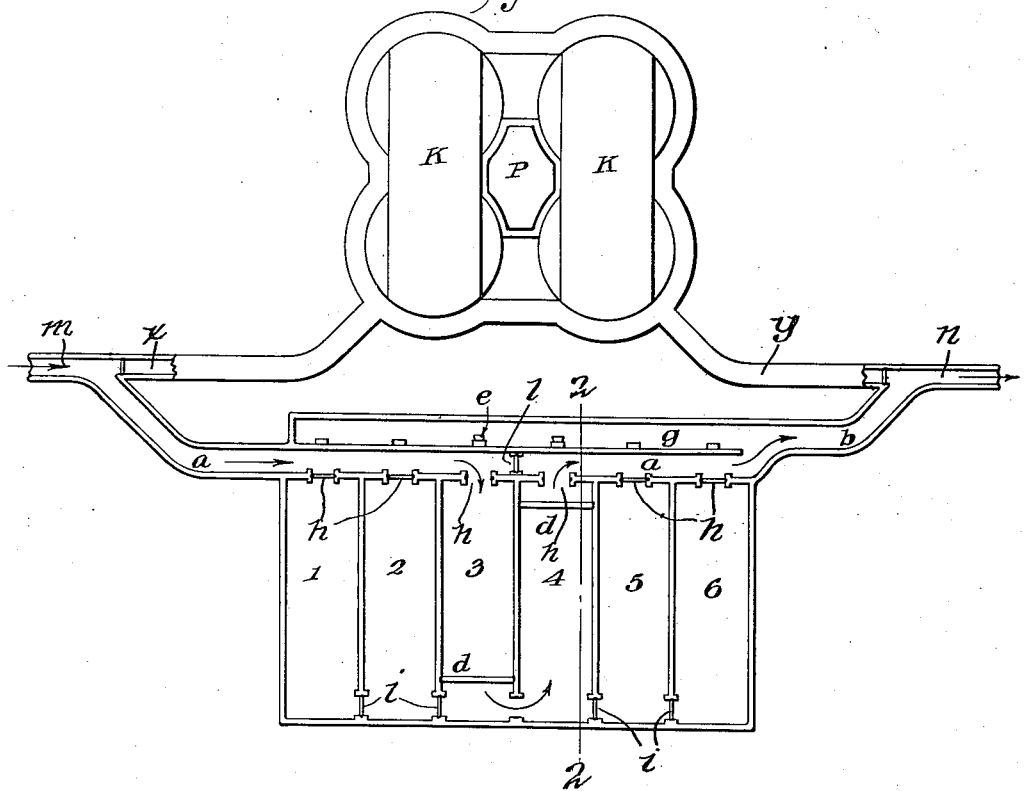
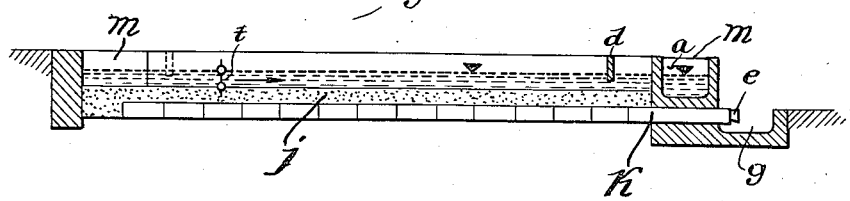
Inventor
Karl Imhoff
By C. P. Goepel
Attorney Patented May 22, 1923.

1,456,312

UNITED STATES PATENT OFFICE.

KARL IMHOFF, OF ESSEN, GERMANY.

COMBINED SLUDGE SEPARATING AND DRYING BASIN.

Application filed September 8, 1921. Serial No. 499,146.

*To all whom it may concern:*

Be it known that I, KARL IMHOFF, a citizen of Germany, residing at Essen, in the State of Prussia, have invented certain new and useful Improvements in Combined Sludge Separating and Drying Basins, whereof the following is a specification.

This invention relates to those systems of sanitary engineering which have to do with the separation and purification of sludge contained in sewage and is especially adapted to installations for smaller cities and towns and individual plants where recovery for fertilizing purposes of the drainage sediment and sewage sludge is an object.

In the ordinary practice of this art the sewage is allowed to flow into deep settling tanks where the sludge is deposited and the surface water allowed to flow off. The sludge so separated is usually deposited in deep tanks under water and is pumped therefrom and distributed or spread on drying places exposed to the air and sunshine. After being dried it is gathered and used as a fertilizer. The objection to this system is that the organic matter putrifies and becomes offensive, emitting rank smells.

The object of the invention is to provide a simple and effective apparatus which will separate the sludge from the water and dry it quickly before putrefaction takes place. To this end the same units of the apparatus become in alternation sludge settling basins and sludge drying basins.

In the accompanying drawings which represent the preferred embodiment of the invention Figure 1 represents a plan view of the apparatus.

Figure 2 represents a transverse section on line 2—2 of Figure 1.

The same reference characters indicate the same parts in both figures.

This apparatus in the form shown comprises a series of shallow basins 1, 2, 3, 4, 5 and 6 disposed side by side, a sewage channel $a$ running past the adjacent ends of said basins, and a drain ditch $g$ outside said sewage channel and parallel therewith. The shallow basins which are preferably rectangular in form are provided respectively with gates $h$ adapted to connect them with the sewage channel and they are also provided adjacent to their other ends with gates $i$ disposed in the partitions which separate the basins one from another. The bottoms $j$ of the basins are porous and preferably composed of sand and below said bottoms are arranged a series of drainage channels $k$ which pass under the sewage channel $a$ and discharge into the drain ditch $g$. These drainage tubes are provided with plugs $e$ or other stopper devices. The basins are also provided with baffles $d$ which may be disposed in front of the outlets thereof as indicated in Figure 1. The sewage channel $a$ is provided with a dividing partition 1 which is disposed between any two of the adjacent basins which are operated in unison.

The sewage channel $a$ is connected with a supply channel $m$, and an outlet pipe $b$ connects at one end with the channel $a$ and at the other end with a discharge pipe or drain $n$.

In the use of this apparatus the basins are operated in pairs. As illustrated in Figure 1 the basin 3 is operating in conjunction with adjacent basin 4. The gates $h$ of said basins are opened and the dividing gate $l$ of the sewage channel $a$ is closed. The baffle plate $d$ of basin 3 is placed near the inner end thereof in front of the open gate $i$ which separates the basin 3 from the basin 4, the gates $i$ of the other basins being closed. A similar baffle plate $d$ is placed near the outer end of the basin 4. The sewage containing water and solid matter flows from the sewer $m$ through the sewage channel $a$ to the gate $h$ of the shallow basin 3 and the solid matter contained therein settles along the porous bottom of the basin and the water passes downward by gravity through said porous bottom and facilitates the collection of the sediment in the form of sludge along said bottom. The sewage continues to flow until the basin 3 is filled with sludge and the surplus water passes over the baffle $d$ of the basin 3 and through the gate $i$ into the adjacent basin 4 and the sediment contained in said overflow is deposited in said porous bottomed basin 4, the water passing downward through said bottom aids in the collection of sludge within said basin. The overflow from the tank 4 passes over the baffle $d$ therein and through the gate $h$ at the outer end of the basin 4 and into the separated end of the sewage channel $a$ and thence into the pipe $b$. The water which seeps through the porous bottoms passes out through the drain pipes $k$ and orifices e into the drain ditch g. When the basin 3 becomes filled with sludge, the gates h and i thereof are closed, the gate l is moved into position in the sewage channel a between the basins 4 and 5, the gate i in the partition between said last named basins in opened and the gate h of the basin 5 is opened. The baffle plate d of the basin 4 is placed near the inner end of said basin and the baffle plate d of the basin 3 is placed near the outer end of the basin 5. Then the basin 4 becomes the primary settling basin, the basin 5 the secondary settling basin and the basin 3 the drying basin. The water from the basin 3 goes quickly out through the porous bottom thereof and leaves the sludge in the form of an accumulated layer on the porous bottom of said basin. The depth of liquid flowing through the basins used as settling basins should not be greater than the thickness of the sludge layer to be formed, for example between four and twelve inches depending on the quality of the sludge. It was a former theory that settling basins or tanks must be so deep as to afford sufficient space above the accumulated sludge for the settling action; but in this apparatus with very flat basins having slightly increased surfaces, as good settling action can be obtained as in deep tanks. In these very shallow basins the sludge rises very quickly almost to the surface of the water shortly after the beginning of the operation. The sludge particles of the sewage which follow are precipitated and deposited in a continuously expanding layer, the later incoming particles being deposited beyond the previously settled particles. The actual space for settling action is therefore not above the settled sludge but beyond it in the direction of the flowing sewage.

In consequence of the extremely low depth of water the settled sludge lies very loose and leaves many spaces between the different fibrous and sandy particles through which the incoming water is able to trickle. During the drying operation the sludge remains loose and on account of the shallow depth of water the time required for flowing through these shallow basins is much less than with the usual deep tanks. This is favorable on account of keeping both sewage and sludge fresh. The extending of the sewage and the sludge in a very thin layer is also favorable for keeping it fresh, because more septic gases are exposed and evaporated and more oxygen is taken in. The influence of light and air on the sludge during the settling operation is also much stronger owing to the thin layer of water.

These underdrained settling basins can be used advantageously in combination with settling tanks of other kinds, for example Imhoff tanks which are already combined with sludge drying places.

In the drawing in addition to the basins 1 to 6 a settling tank plant K is shown which is connected by a channel X with the sewage channel a and by channel y with the sewage outlet n. The sludge from the tanks K is pumped by the pumping station P into the basins 1 to 6 which then become sludge drying places. The sludge drying places can be put to work as settling basins for a part of the sewage or the whole sewage, if the ordinary settling tanks for the time being are overloaded or if they are defective. It may happen, especially in winter, that the deep settling tanks are overloaded with sludge. At such a time these underdrained settling basins are sure in working because they cannot be damaged by frost. Even half dried sludge can be moved on in a frozen state and the basins freed therefrom in a short time.

Thus this apparatus affords a very quick means for settling the sludge and drying it in the same receptacle whereby putrefaction and the resulting offensive odors therefrom are avoided.

I claim as my invention:

1. In a sewage treating apparatus the combination of a sewage channel, a series of open porous bottomed shallow basins disposed side by side with their adjacent ends abutting said channel, gates connecting said basins with said channel and one with another, and movable baffle plates in said basins, said shallow basins serving in pairs and in alternation as sludge settling basins and as sludge drying basins, their contents being exposed to light and air during both the settling and the drying operations.

2. In a sewage treating apparatus the combination of a sewage channel, a series of open porous bottomed shallow basins disposed side by side with their adjacent ends abutting said channel, gates connecting said basins with said channel and one with another, and movable baffle plates in said basins, a drain ditch, and stoppered drain pipes connecting said shallow basins underneath their porous bottom with said drain ditch, said shallow basins serving in pairs and in alternation as sludge settling basins and as sludge drying basins, their contents being exposed to light and air during both the settling and the drying operations.

In testimony that I claim the foregoing as my invention, I have signed my name in presence of two subscribing witnesses.

KARL IMHOFF.

Witnesses:
JOHANN THUZCHEIDZ,
N. DUNGS.